UNITED STATES PATENT OFFICE.

FRANKLIN R. CARPENTER, OF DENVER, COLORADO, ASSIGNOR OF ONE-HALF TO JOSEPH H. BERRY, OF DETROIT, MICHIGAN.

METHOD OF TREATING ORES.

SPECIFICATION forming part of Letters Patent No. 722,809, dated March 17, 1903.

Application filed July 13, 1902. Serial No. 117,848. (No specimens.)

*To all whom it may concern:*

Be it known that I, FRANKLIN R. CARPENTER, a citizen of the United States, residing at Denver, in the county of Arapahoe and State of Colorado, have invented certain new and useful Improvements in Methods of Treating Ores, of which the following is a specification.

My invention relates to the treatment of ores to recover the metallic values therefrom, and especially to a process capable of economical application to the highly-silicious ores, either with or without pyrite, which are frequently found. These ores containing relatively small amounts of the precious metals cannot be economically subjected to the ordinary lead-smelting because of the excessive losses of lead in the slag, nor can they, by reason of their location, be profitably treated by wet methods, because no wet method so far discovered is applicable to the extraction of both gold and silver at one operation. Such ores are found in the Black Hills, containing gold and silver and silica averaging about seventy-four per cent.; iron oxid, ten to twenty per cent.; alumina, four to five per cent.; lime, two to four per cent., and in less quantities other bodies, but only a small percentage of sulfur. Others of the second class are found in the Gilpin county section, and consist of a silicious gangue and pyrite, but yet calling for enormous quantities of basic flux. In treating such ores according to my invention the precious values are first concentrated in an impure metallic copper, approximating what is known as "black" copper. This impure metallic copper containing the precious values is then mixed with metallic lead and subjected to heat and an oxidizing blast, as in ordinary cupellation, thus producing an oxidation product consisting of coppery litharge and a metallic residue containing the precious values. The latter may be separated and refined in any desired way, and the former may be smelted for the recovery of the lead and copper.

In detail in operating on ores such as that above mentioned I proceed as follows: The ores are smelted with pyrite and limestone, so as to produce matte carrying gold and silver and a worthless slag which is thrown away. As such ores are generally low in copper, there must be often added at this or at a later stage sufficient copper in which to concentrate the precious metal or metals. Where it can be conveniently obtained, copper pyrites may be employed as the source of both the sulfur and copper, in which case, of course, the copper will be added before matting; but other sulfids may be used, and the copper may be added to the first matte or matte of the first smelting in the metallic state. These bodies, together with fuel, are charged into any suitable matting-furnace, such as a cupola or low-blast furnace, and smelted, the resultant matte and slag being drawn off as they are formed. The matte thus produced I prefer should contain about five per cent. of copper. The matte thus produced is then roasted with free access of air. If copper was not contained in or added to the ore in the first smelting, above described, copper must now be added. It may be stated that it is immaterial at which stage in the process the copper is added and that the two modes of procedure are full equivalents and the one or the other will be adopted which will be found most convenient with the materials on hand. Therefore where I set forth that copper is added to the ore before smelting to produce matte I mean to include also adding copper to the roasted matte. The roasted matte, containing copper, or roasted matte and copper, is then resmelted in any suitable furnace, with sufficient silicious flux to slag off as far as possible the iron and other impurities. The product of this resmelting will be black copper and a rich slag, which should be added to subsequent charges in the first smelting-furnace. The black copper obtained in the preceding operation is then mixed with metallic lead, the proportion depending upon the subsequent refining of the litharge. If the bulk of the silver is sought at once, the proportion must be large—say six parts of lead to one of copper; but if little lead is added much of the silver will go in the litharge; but as this is recovered in subsequent operations it is of little import. If the copper is cupelled without the addition of lead, as may be done, much higher heat is required, and practically all the silver will go into the cuprous oxid. The addition of lead at this point then is for the threefold purpose of enabling the cupellation to be carried on at a lower heat, for the lessening of the amount of silver that is oxidized and carried into the coppery litharge and for the bearing that it may have upon subsequent refining operations. The whole of the lead may all be added to the copper at once or it may be added as needed. When added in large amounts—say six parts of lead to one of copper—the litharge is very fusible; but good results are had with only thirty per cent. of the weight of the copper and practically all the gold will be recovered; but the silver will pass largely into the coppery litharge. This mixture of copper and lead is melted and subjected to an oxidation process in any desired form of cupellation-furnace. The result of the operation of this part of the process is an oxidation of the copper and lead, forming a coppery litharge and a residue containing the bulk of the precious metals, which may vary to practically all the gold (when little lead is used) to practically all the gold and silver, (when much lead is used,) which may be placed on the market or refined and separated in any desired way. If the quantity of lead that had been added is large, the coppery litharge obtained in the above operation is then mixed with galena or other sulfid and other reducing agents and smelted in any suitable furnace—for instance, a blast-furnace. The product of this smelting is metallic lead and lead-copper matte. These are separated and the lead may be used in cupelling additional quantities of black copper. The lead-copper matte is refined in a test or cupelling furnace, forming as products metallic copper and lead-copper slag. The metallic copper may be sold as such or used as a source of supply for the copper to be added in subsequent ore or matte or matte smelting operations previously described. The coppery-lead slag should be added to subsequent charges of coppery litharge to be resmelted. If the amount of lead is small, I add a reducing agent sufficient to form a metallic bottom analogous to the copper bottoms formed from sulfid or matte in the ancient Welsh process of making best selected copper. This bottom, however, is formed from cuprous oxid and will consist, mainly, of lead, which carries down the silver, leaving the cuprous oxid clean and ready for market and which can be used as such or reduced to metallic copper, while the metallic bottom is cupelled directly for its precious metals and the coppery litharge from this operation added to some previous operation or reduced, as in the first instance, with galena.

It will be seen that by my process the bulk of the materials carrying the precious metals is greatly reduced before they are acted on for the recovery of such values; also, that there will be no loss of lead in silicious slags. Further, it is obvious that, except by volatilization, none of the valuable metals contained in the ore or the metals used in its treatment can be lost, since when such losses occur by imperfect separation they are returned to subsequent charges by the reuse of the materials.

Having now described my invention, what I claim is—

1. The process of treating dry silicious ores containing precious metal which consists in smelting them with sulfur, copper and a basic flux, subjecting the matte produced to an oxidizing roast then resmelting the product with a silicious flux, thereby producing black copper containing the precious metal and a rich slag, adding the rich slag to a subsequent charge of ore, adding to the black copper metallic lead, subjecting the mixture to heat and an oxidizing blast thereby forming coppery litharge and a residue consisting mainly of precious metal, separating the two, smelting the coppery litharge with a sulfur-bearing material, and other reducing agents, thereby producing metallic lead and matte, and finally smelting the matte, producing metallic copper substantially as described.

2. The process of treating silicious ores containing precious metal which consists of smelting them with sulfur, copper, and a basic flux, subjecting the matte produced to an oxidizing roast, then resmelting the product with a silicious flux, thereby producing black copper, containing the precious metal, and a rich slag; adding the rich slag to a subsequent charge of ore, adding to the black copper metallic lead, subjecting the mixture to heat, and an oxidizing blast, thereby forming a coppery litharge, and a residue containing precious metal, separating the two, smelting the coppery litharge with a reducing agent, thereby forming a metallic bottom carrying practically all the lead, some copper, and the residue of precious metal, and separating this from the remaining copper oxid, and reducing the copper oxid to metallic copper, substantially as described.

3. The process of treating dry silicious ores containing a precious metal, which consists of smelting them with sulfur, copper and a basic flux, subjecting the matte produced to an oxidizing roast, then resmelting the product with a silicious flux, adding to the metallic product metallic lead, subjecting the mixture to heat and an oxidizing blast, thereby forming coppery litharge and a residue consisting mainly of precious metal, smelting the coppery litharge with a sulfur-bearing material thereby producing metallic lead and matte, and finally smelting the matte, substantially as described.

4. The process of treating silicious ore, containing precious metal, which consists of smelting them with sulfur copper and a basic flux, subjecting the matte produced to an oxidizing roast, then resmelting the product with a silicious flux, adding to the metallic product metallic lead, subjecting the mixture to heat, and an oxidizing blast, thereby forming coppery litharge, and a residue containing precious metal, smelting the coppery litharge with a reducing agent, thereby producing metallic lead, carrying the remaining precious metal, and cuprous oxid, and finally reducing the cuprous oxid, substantially as described.

5. The process of treating ores containing precious metal, which consists in concentrating the precious metal in a mass of impure metallic copper, mixing said mass with metallic lead, subjecting the mixture to heat and an oxidizing blast, thereby forming coppery litharge and a residue consisting mainly of precious metal and finally separating the two products, substantially as described.

6. The process of treating dry silicious ores containing precious metal, which consists in smelting them with sulfur, copper and a basic flux, subjecting the matte produced to an oxidizing roast, then resmelting the product with a silicious flux, mixing the metallic product with metallic lead, subjecting the mixture to heat and an oxidizing blast, thereby forming coppery litharge and a residue consisting mainly of precious metal, and finally separating the two products, substantially as described.

7. The process of treating dry silicious ores containing precious metal, which consists in smelting them with sulfur, copper and a basic flux, subjecting the matte produced to an oxidizing roast, then resmelting the product with a silicious flux, thereby producing black copper containing the precious metal and a rich slag, utilizing the slag as a portion of the charge with another batch of ore, mixing the black copper with lead, subjecting the mixture to heat and an oxidizing blast, thereby forming coppery litharge, and a residue consisting mainly of precious metal, and, finally, separating the two products, substantially as described.

8. The process of treating dry silicious ores, containing precious metal, which consists of concentrating the precious metal into a mass of impure metallic copper, cupelling said mass with metallic lead by subjecting the mixture to heat and an oxidizing blast, thereby forming a coppery litharge, and a residue consisting mainly of precious metal, and subjecting the coppery litharge thus formed to a partial reduction, forming a leady-copper bottom, carrying the precious metal that remained in the coppery litharge, and the cupelling of this leady-copper bottom by subjecting the same to an oxidizing blast, and the recovery of the contained precious metal, substantially as set forth.

9. The process of treating silicious ores containing precious metal, by concentrating the precious metal into a mass of impure metallic copper containing lead, and subjecting this mass to heat and an oxidizing blast, thereby forming an impure cuprous oxid, and a residue containing precious metal, subjecting the impure cuprous oxid to a partial reduction, thereby freeing it from the lead, precious metal, and other impurities, forming a metallic bottom, and leaving the cuprous oxid free from impurities, and ready for subsequent refining, and the subjecting of the resulting bottom to heat, and an oxidizing blast, and the recovery of the contained metals, mainly silver, substantially as set forth.

In testimony whereof I have hereunto subscribed my name.

FRANKLIN R. CARPENTER.

Witnesses:
E. REYBOLD, Jr.,
GEORGE VICKERS.